United States Patent [19]

Hamilton

[11] Patent Number: 4,879,210

[45] Date of Patent: Nov. 7, 1989

[54] METHOD AND APPARATUS FOR TEACHING SIGNING

[76] Inventor: Harley Hamilton, 626 Collingwood Dr., Decatur, Ga. 30032

[21] Appl. No.: 318,658

[22] Filed: Mar. 3, 1989

[51] Int. Cl.$^4$ .............................................. G09B 5/06
[52] U.S. Cl. ..................................... 434/112; 434/307
[58] Field of Search ............... 434/112, 157, 307, 308, 434/309

[56] References Cited

U.S. PATENT DOCUMENTS

| | | | |
|---|---|---|---|
| 2,950,543 | 8/1960 | Ritter et al. | 434/157 X |
| 3,369,308 | 2/1968 | Curran | 434/157 X |
| 4,121,357 | 10/1978 | Hoffman | 434/307 X |
| 4,333,092 | 6/1982 | Field | 434/112 X |

OTHER PUBLICATIONS

A.P.C. Application of Vignal, S.N. 386,191, published Apr. 27, 1943.

*Primary Examiner*—William H. Grieb
*Attorney, Agent, or Firm*—James B. Middleton

[57] ABSTRACT

A method of teaching signing juxtaposes portions of a story with summaries of the portions in sign language. A video tape or movie is divided into portions at natural changes in the story. The signing is presented either before or after the portion of the story and replaces the story on the full screen. The summary can be voiced simultaneously to teach sign language to a person with normal hearing, and written sub-titles can be added. The tape can be used to allow a hearing impaired person to enjoy the story and/or to teach a person sign language.

16 Claims, No Drawings

METHOD AND APPARATUS FOR TEACHING SIGNING

INFORMATION DISCLOSURE STATEMENT

The use of signing for communication with the hearing impaired is well known and established, primarily among the hearing impaired. There has long been the problem that people with normal hearing do not learn signing, which limits the population with whom the hearing impaired can communicate. The learning of signing is usually a study, much of which comprises rote learning. As a result, considerable practice is necessary for a person to become highly competent, or fluent, in this language.

There has been some effort to adapt the standard mass media such as television for comprehension by the hearing impaired. These prior art efforts usually take the form of "Close Captions" wherein a signal broadcast with the program is de-coded and caused to place subtitles on the television screen. Some programs have been broadcast with subtitles, without the requirement for a special de-coder. In either case, however, it is necessary that the viewer be quite literate, and mature enough to read and comprehend the written statement, then to view the picture and mentally assemble the whole. While an adult having good intellectual capacities can handle this successfully, there are many who, because of age, education or intelligence, cannot successfully comprehend such material.

Another prior art method for allowing the hearing impaired to comprehend television shows and the like is to provide the words in sign language, showing only the upper half of the person signing, and only in one corner of the screen. Again, for a mature person this technique may be adequate; however, for a less mature person the requirement to look at the signing for comprehension of the words, to look at the pictures, and to assemble the two into a meaningful whole is not fully possible.

The prior art therefore has no means for allowing a hearing impaired child or the like to comprehend television shows, and/or to provide the learning situation inherent in allowing such child to enjoy a show that is communicated in sign language.

SUMMARY OF THE INVENTION

This invention relates generally to a method and apparatus for teaching signing, and is more particularly concerned with a story presented in normal sound and pictures, the story being interspersed with explanations of the story in sign language.

The present invention provides a conventional story, the story having natural breaks, or changes therein, and the method of the invention includes the steps of showing the story up to one of the natural breaks, then stopping the story and showing a person signing the portion of the story just shown, optionally with the person speaking the words simultaneously and/or with subtitles or captions. Following the signing, the story is resumed, and is shown to the next natural break. This next portion of the story is then told in sign language, and the process continues to the end of the story.

As an alternative, and the substantial equivalent, the signing can precede the showing of the story. The signing will extend to a natural break in the story, then the story will be shown. Signing will then carry the story to the next break, and so forth.

In a preferred embodiment of the invention, the story will be stopped and completely removed from the screen. The screen will then be substantially filled with the image of the person signing, and with or without simultaneous audible verbalization of the words and/or showing the written words. Another form of the invention contemplates the stopping of the story, and the relegation of the last picture to less than the full screen, the balance of the screen being used to show the person signing. At the completion of the signing, the stopped picture will fill the screen and the action will continue.

DETAILED DESCRIPTION OF THE EMBODIMENTS

These and other features and advantages of the present invention will become apparent from consideration of the following specification disclosing the embodiments presented by way of illustration.

It should first be realized that the present invention is applicable to any form of communication that includes a recording of both sound and pictures. While the most common forms of such recordings are motion pictures and video tape, the invention is readily adaptable to other forms including material recorded in electronic chips and the like. Thus, the following description will utilize videotape by way of example, but it should be understood that the references to tape are intended to include other recording media.

Considering the invention in detail, the first step in carrying out the invention is to select a particular tape, and the story on the tape may be either educational or entertaining. For purposes of illustration it will be assumed that the story is educational, and teaches a person how to plant a vegetable garden. The tape will be viewed carefully, and notations will be made as to the breaks, or changes, in the story. Once the breaks are known, the tape is reviewed, and the story is broken down into the various portions that occur between the breaks. It is important that the breaks be rather natural breaks, or changes, in the story so the action or flow of the story is not unduly interrupted, but has sufficient continuity for easy comprehension With the breaks located, the next step is to consider the individual portions of the story and to create meaningful summaries of the plurality of portions. These summaries will be in narrative form and will detail and highlight key elements of information in the portions of the story. The summaries are then "performed" by a person signing, and perhaps simultaneously speaking the lines of the summary, the performance being taped.

After all the summaries of the plurality of portions have been performed and taped, the original tape will be edited, splicing in the summaries between the plurality of portions of the story. The result is that one tape will present a portion of the story, followed by a summary of the preceding portion performed in sign language. Just as the story will occupy the full screen and receive the full attention of the viewer, the summary will occupy the full screen, and likewise receive the full attention of the viewer. As a result, a child can focus entirely on the story during the showing of the portions of the story without having to read or view other material at the same time. When the summary is being shown, the child will view only the person signing without other things on the screen to distract the child. Further, the summary will be of such duration that the child will not lose interest. It has been found that periods of 20 seconds or less achieve the desired ends.

Within the scope of the present invention, the screens presenting the signing are capable of some variation depending on the intended use of the tape and the mental abilities of the intended audience. One possibility is of course to have the entire screen filled with the image of a person presenting the summary in sign language. This would be efficient for a hearing impaired person to enjoy and/or comprehend a story.

Another possibility is to fill the entire screen with the image of a person signing, and to have the person also speaking audibly. The sounds coupled with the signing are admirably suited to assist a person with normal hearing in learning sign language. Also, or alternatively, the printed words can be added to the screen in the form of sub-titles. A person who is hearing impaired but can read can use such a tape either to learn sign language or to increase the comprehension and vocabulary.

As has been mentioned briefly above, rather than using the full screen for the image of the person signing, it is also possible to use less than a full screen, perhaps about half the screen. One half the screen will have, stopped, the last frame shown of the story. The other half of the screen will have the person signing, possibly with the variations just described above.

For use as a teaching tool, and especially for younger children and others who do not have great mental abilities, there is another variation useful largely for teaching. The screen will be divided into a plurality of sub-screens. The plurality of sub-screens will present a phrase or a sentence, one word for each sub-screen. The technique is that the plurality of sub-screens will show an image of the signer, the image being stopped. The images on the sub-screens will then move to perfrom the phrase or sentence, each sub-screen performing each word.

Preferably, the scanning of the plurality of sub-screens will be like reading, in that the first word will be the top, left sub-screen, and progress will be left-to-right, then down to the next line, etc. With this mode of progress, the words in writing can be placed on each sub-screen. The viewer will then progress as in normal reading, and will simultaneously see the sign for the word. As before, audible speech can also be added.

It will be obvious to those skilled in the art that the use of the plurality of sub-screens has natural limitations. The sub-screens must become smaller as the number increases, so the image would become too small for viewing if too many sub-screens are used. It is thought that around nine sub-screens will be a practable maximum for present television sets. As few as one or two might be used, depending on the phrase or sentence. One might wish to illustrate "Fire!" which would require one screen. The statement "Go home" would require two sub-screens. The number of sub-screens will therefore be dictated by the particular illustration, and limited by the size of the screen and the resolution power of the medium.

In an effort to define the portions of the story somewhat better, we can assume the story to teach the planting of a vegetable garden. One would select the seeds to be planted and read the instructions, then gather the necessary tillage tools and select a spot in the ground to do the planting. The area would be laid out, then the ground prepared for the seed. After appropriate preparation, rows would be defined and furrows dug. Seed will be distributed in the furrows and the seed covered with earth. Markers would then be placed at each row to identify the crop planted.

Using the above brief outline as the story, it will be seen that the story breaks naturally into a plurality of portions. To select seeds and read growing instructions is one portion, and the next step of gathering tillage tools constitutes a definite change in the story. The steps of gathering tools and surveying the available ground for a planting spot may be such a continuous activity that it will be kept together; then, the next change is the laying out of the garden area, and preparation of the ground. The next portion of the story is the defining of rows and digging of furrows. One must stop after the furrows and get the seed, then place the seed in the furrows, so the digging of furrows may cosititute a natural break or change in the story. The final portion of the story then is the actual distribution of seed, and covering of the seed.

With the above example in mind, it should be understood that a person viewing the final tape will view the story, seeing the actors in a seed store selecting vegetables, and checking the instructions to determine the proper procedures. The story will stop, and a person signing will review the action, explaining what the actors were doing. The viewer will thereby gain a full understanding of the first portion of the story.

Next, the viewer will see the people involved select particular tillage tools, and look over available land to determine where to plant the garden. The story will stop, and a person signing will present the selection of tools, and the selection of ground area. At the end of this discussion, the story will resume and show the people laying out the ground area, and the preparation of the ground. When the ground is prepared and the action must change to the next activity, the story stops, and the viewer sees a person signing and explaining the steps just taken in the story.

From the foregoing description it should be understood that the portions into which the story is divided are rather naturally occurring portions, normal breaks in story flow being the divisions between portions. Also, it will be understood that the breaks are not necessarily specific points; rather, there may be stories in which two or more points are equally likely break points. In the above example, one could group the reading of instructions for planting and the gathering of tillage tools. Next, the area would be surveyed, and a garden plot marked out. The story and the translation into sign language would work quite well with this alternative portioning, the important feature being the breaking of the story along natural lines.

From the foregoing discussion, the method for preparing a tape in accordance with the present invention, and the nature of the resulting tape, should be understood. The uses of the tape should therefore be understandable.

One possible use of a tape made in accordance with the present invention is simple entertainment. A hearing impaired person, such as a child, can view the tape of the present invention and understand the story being presented. No reading skills are required, and the attention to only one sequence at a time is required. The child can therefore follow the action and receive full enjoyment from the entertainment.

Another possible use is for education of the child watching the tape. If the child is hearing impaired, the coupling of the signing with the action gives the child a broader "vocabulary" so the child can be more expressive in sign language. If the child is not hearing impaired, the tape may be for the purpose of teaching the child sign language. Assuming the person signing is simultaneously speaking the words, the viewer hears the word or phrase at the same time the viewer sees the sign for those words. This presentation together will teach the meaning of various signs.

In the latter case it will be realized that the viewer may be a highly intelligent adult. In any event, if a person is to learn sign language, the presentation of the sign along with the word or words for the sign provides a good learning situation. The learning is further reinforced in that the story is presented between the periods of signing, so the normally hearing viewer receives the complete story through visual and auditory senses, then perceives a summary that pairs sign language with audible words. Finally, the written words can be added to the screen for teaching or comprehension. The viewer therefore has a plurality of perceptions to compare to one another and to reinforce one another.

Whether the tape of the present invention is used for education or entertainment, it will be understood that the technique is the same. Once the tape of the present invention has been completed, various uses will suggest themselves to those skilled in the art. Also, whether the signing comes before as a prelude, or after as a summation, is a matter of choice. The important point is that a rather natural portion of the story is told in sign language, the story being stopped for the sign language. Also, the signing preferably occupies the full screen, but the signing may occupy, for example, a half-screen, with the other half of the screen being occupied by the last frame of the stopped story. In either case, the signing is the only action proceeding at the time, so the viewer is not attempting to comprehend both the normal story and the summation.

It will therefore be understood by those skilled in the art that the particular embodiments of the invention here presented are by way of illustration only and are meant to be in no way restrictive; therefore, numerous changes and modifications may be made, and the full use of equivalents resorted to, without departing from the spirit or scope of the invention as outlined in the appended claims.

I claim:

1. Apparatus for teaching signing including a tape having a story recorded thereon, said story being divided into a plurality of portions wherein each portion comprises an integrated part of said story, each said portion of said story being between natural breaks in said story, and further including a plurality of recordings of a person signing, each recording of said plurality of recordings of a person signing comprising a recording of a person signing a summary of one portion of said plurality of portions of said story, said recordings of a person signing being interspersed between said portions, a given portion and the summary of said given portion being juxtaposed.

2. Apparatus as claimed in claim 1, said recording of a person signing a summary of one portion immediately following said one portion.

3. Apparatus as claimed in claim 1, said recording of a person signing a summary of one portion immdediately preceding said one portion.

4. Apparatus as claimed in claim 1, wherein said recording of a person signing includes audible verbilization simultaneously with said signing.

5. Apparatus as claimed in claim 1, wherein said recording of a person signing includes written words presented as sub-titles with said signing.

6. Apparatus as claimed in claim 5, said recordings of a person signing being divided into a plurality of sub-screens, each sub-screen of said, plurality of sub-screens presenting one sign of said summary.

7. Apparatus as claimed in claim 4, said recording of a person signing yielding an image that occupies at least half the screen for viewing said tape.

8. Apparatus as claimed in claim 7, said recording of a person signing yielding an image that occupies substantially the entire screen for viewing.

9. Apparatus as claimed in claim 4, said recording of a person signing having a maximum time duration of 20 seconds.

10. A method for teaching signing including the steps of recording a story on a tape, dividing said tape into a plurality of portions of said story, preparing a summary of each portion of said plurality of portions of said story, recording a person signing said summary of each portion of said plurality of portions of said story, and interspersing the recordings of a person signing between said plurality of portions.

11. A method as claimed in claim 10, a summary of a given portion being placed immediately before the given portion.

12. A method as claimed in claim 11, a summary of a given portion being placed immediately after the given portion.

13. A method as claimed in claim 10, and further including the step of providing audible verbalization of said summary during the said step of recording a person signing said summary.

14. A method as claimed in claim 10, and further including the step of reviewing said story for determining the location of inherent changes in action, and using said locations for the said step of dividing said tape into a plurality of portions.

15. A method as claimed in claim 14, and further including the step of defining a plurality of sub-screens during said step of recording a person signing, and including one sign in each of said sub-screens.

16. A method as claimed in claim 15, and further including the step of placing a printed word in each of said sub-screens, said word being the equivalent of the sign in that sub-screen.

* * * * *